United States Patent [19]

Pawlik

[11] Patent Number: 5,035,546

[45] Date of Patent: Jul. 30, 1991

[54] RADIUSED ON-EDGE INDEXABLE CUTTING INSERT

[75] Inventor: James A. Pawlik, Sterling Heights, Mich.

[73] Assignee: GTE Valenite Corporation, Troy, Mich.

[21] Appl. No.: 103,464

[22] Filed: Oct. 1, 1987

[51] Int. Cl.⁵ .............................................. B23B 27/16
[52] U.S. Cl. .................................... 407/116; 407/113; 407/62
[58] Field of Search ............... 407/113, 114, 115, 116, 407/117, 53, 42, 62, 64

[56] References Cited

U.S. PATENT DOCUMENTS

| | | | |
|---|---|---|---|
| 3,279,034 | 10/1966 | Kaiser | 407/1113 |
| 4,411,564 | 10/1983 | Johnson | 407/113 |
| 4,585,325 | 4/1986 | Erkfritz | 407/113 |
| 4,699,549 | 10/1987 | Shimomura | 407/113 |
| 4,709,737 | 12/1987 | Jonsson | 407/114 |

Primary Examiner—Frederick R. Schmidt
Assistant Examiner—Blynn Shideler
Attorney, Agent, or Firm—Bill C. Panagos; David J. Koris

[57] ABSTRACT

On-edge indexable insert for cutting radiused corners including circular arc cutting edges each with trailing surface formed with convex compound curvature as a toric segment intersecting the adjacent side wall to provide a planar abutment surface when a cutting edge is indexed to an inactive position.

15 Claims, 2 Drawing Sheets

RADIUSED ON-EDGE INDEXABLE CUTTING INSERT

BACKGROUND OF THE INVENTION

On-edge indexable inserts having radiused cutting edges for machining arcuate corners are known in the art for use in end mills, face mills and boring tools, in both positive and negative configurations. In one form, the radius extends uniformly from the cutting edge backwardly for the full width of the insert. Mounting of such insert requires either tilting toward a negative angle or mounting in advance of the tool center line or both in order to provide clearance within the cutting radius for the trailing portion of the insert.

U.S. Pat. No. 4,411,564 discloses an on-edge indexable cutting insert wherein each cutting end of the insert is formed with a convexly curved surface which gradually decreases in area per unit of length as the curved surface proceeds away from the cutting edge so as to form each cutting edge with a convexly curved tip of relatively large radius while leaving a flat and planar locating surface of substantial area on each end of the insert. Such construction accommodates a relatively large radius without unduly reducing the planar surface remaining for registration against a locator at the rear of an insert pocket when the insert is indexed to place the adjacent cutting edge in an inactive position. While such construction accommodates a relatively large corner cutting edge radius for a full 90° which may approximate the thickness of the cutter, the diminishing radius away from the cutting edge does not eliminate a requirement, similar to a uniform radius, to provide clearance for the trailing surface through resort to a more negative or advanced positioning of the insert.

BRIEF DESCRIPTION OF THE PRESENT INVENTION

It has now been found possible to combine improved trailing surface clearance with full insert thickness radius and adequate planar surface abutment by providing a compound convex curvature behind the arcuate cutting edge corresponding to a circular arc cutting edge, having a radius which may be substantially equal to the thickness of the insert, generating a segment of a torus from an axis outside of and normal to the face of the insert, preferably in a plane substantially bisecting the insert, extending across the full width of the insert from the cutting edge to the trailing corner. When such construction starts with a circular arc cutting edge extending substantially to the seating surface of the insert, a constant radius surface of diminishing area extends rearwardly of the cutting edge with a corresponding planar locating surface of an increasing dimension to the intermediate position of the aforesaid bisecting axial plane, followed by an increasing arcuate surface area and decreasing planar locating surface.

Such compound curvature construction results in an adequate locating planar surface for registration with a matching planar pocket wall when the cutting edge is in an inactive position while materially reducing the need for tilting the insert toward a negative position or advancing it beyond the center line of the cutter body in order to provide adequate clearance. Thus, a positive rake insert may be located with the cutting edge on a radial plane with minimal tilting toward negative required for clearance. Such construction may be employed with the cutting edge at the intersection of the acute angle corners of a positive insert having provision for a maximum radius substantially equal to the thickness of the insert; or may be similarly employed at the four corners of a square or rectangular negative insert; or may be employed in a negative square or rectangular insert with eight index positions providing a cutting radius substantially equal to one half of the insert thickness.

On-edge inserts constructed in accordance with the present invention may be employed to provide radial corners in any of end mill, face mill or boring tool operations.

DETAILED DESCRIPTION OF PREFERRED EMBODIMENT

The present invention resides entirely in the illustrated compound curvature form provided on the cutting ends of an indexable on-edge insert directed to achieve a) maximum radius for a given thickness of insert; b) improved clearance behind the cutting edge reducing conventional requirement for positioning the radial rake toward a negative condition and/or ahead of center line; and c) provision of adequate abutment surface when the cutting edge is indexed to inactive position. The disclosed curvature with its resulting advantages can be applied to square or rectangular negative inserts, as well as the positive insert shown, for use in end mills, face mills or boring tools wherever radiused corners are to be machined and with the inserts secured by center screw or other suitable clamping means.

Figure 1:
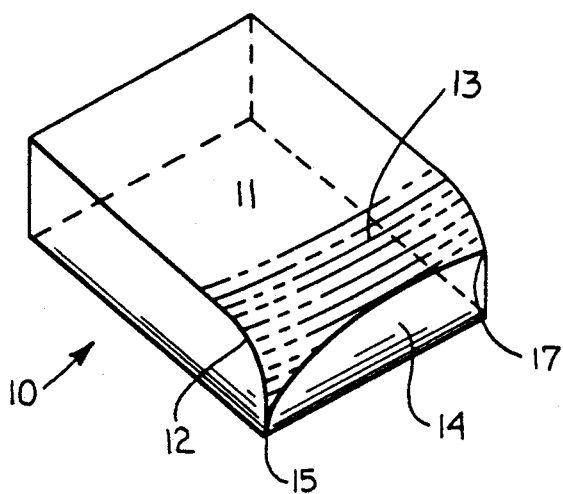
FIG. 1 is a perspective view of an insert blank having a compound convex surface curvature with circular arc cutting edge of the present invention applied to one of the cutting ends of the insert.
Figure 2:
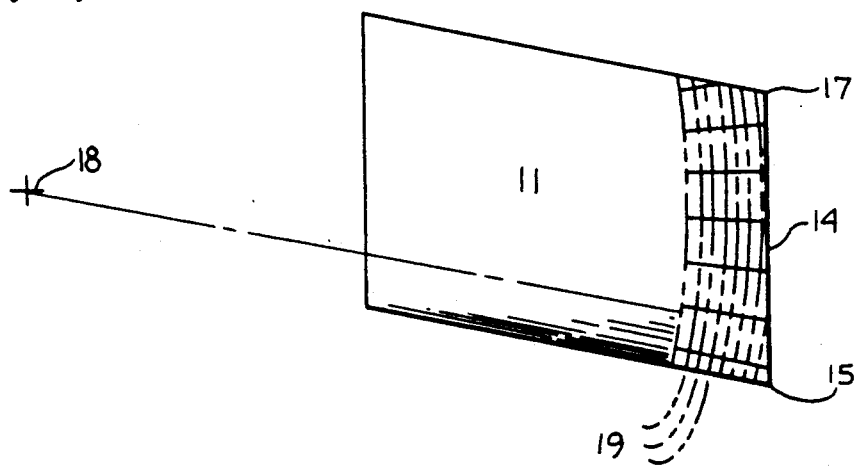
FIG. 2 is a plan view of the insert blank illustrated in FIG. 1.
Figure 3:
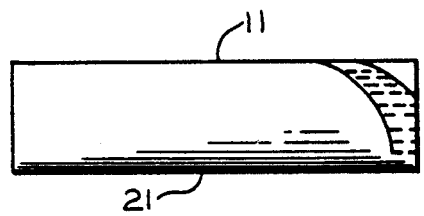
FIG. 3 is a side view of the insert blank illustrated in FIG. 2.
Figure 4:
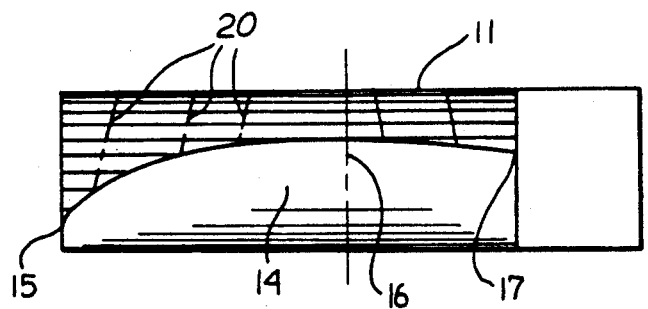
FIG. 4 is an enlarged end view of the insert blank illustrated in FIG. 2.
Figure 5:
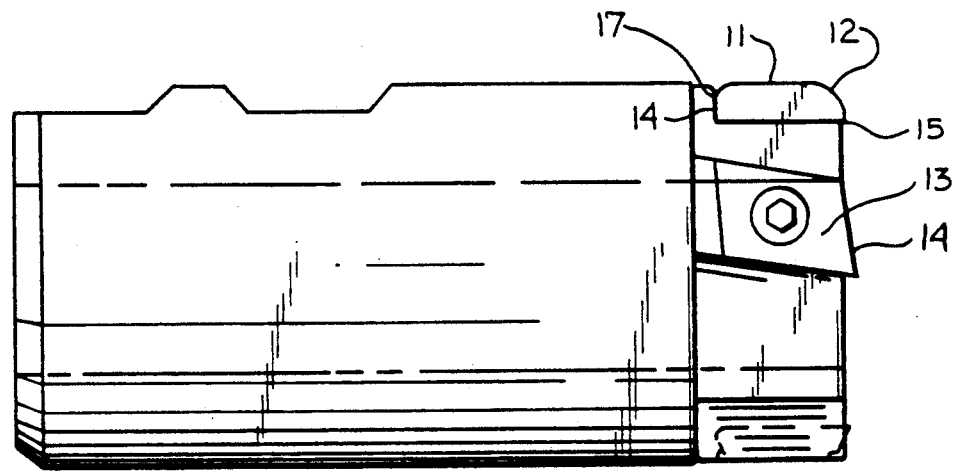
FIG. 5 is a side elevation of an end mill equipped with corner radius inserts of the present invention.
Figure 6:
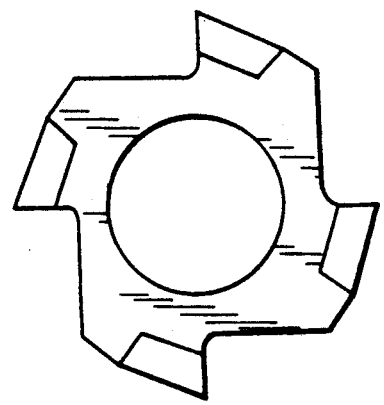
FIG. 6 is an end view of the FIG. 5 end mill.

It will be understood that in the FIGS. 1–4, 7 illustrated embodiment of a positive insert blank, the compound curvature shown is to be symmetrically applied to the other end of the insert to render it indexable to two positions; and that in the case of a square negative insert, the same or similar curvature can be symmetrically applied to all four sides to achieve four index positions; or with half the radius 25 shown, eight index positions 12 a-h may be provided with four cutting positions on each face. However, because the same compound curvature configuration is employed in all cases within the scope of the invention, the illustration, and description will be confined to the single embodiment shown, with a single example of employment in the on-edge positive indexable insert end mill of FIGS. 5 and 6.

In order to provide insert blank 10 exposed face 11 with maximum radius circular arc cutting edge 12 for a substantially full 90° radiused corner, clearance surface 13 and abutment surface 14 intersect on a curve beginning at point 15 on arc 12 reaching a maximum abutment height at point 16 which diminishes and terminates at point 17 on the trailing edge.

The compound curvature surface 13 corresponds to that generated by swinging circular arc 12 on an axis 18 extending normal to the plane of face 11 at a substantial distance outside of the insert and preferably in a plane bisecting the insert extending normal to abutment face 14. The resulting trace of circular arcs 19 centered on axis 18 in progressive planes parallel to face 11, lie on circular arcs 20 of the surface 13 traced by the intersection of any radial plane containing axis 18 thereby providing a surface of compound curvature corresponding to a segment of a torus.

I claim:

1. On-edge indexable insert for cutting arcuate corners comprising parallel seating and exposed faces, four sides extending between said faces, an arcuate cutting edge oriented at the intersection of at least two of said four sides, and an arcuate surface with compound convex curvature extending backwardly from said arcuate cutting edge, said arcuate surface intersecting a planar side surface having a minimum dimension at said cutting edge increasing to a maximum intermediate dimension and diminishing toward the trailing edge to provide a planar locating surface for abutment in an insert pocket of a tool when said cutting edge is indexed to an inactive position.

2. Insert of claim 1 wherein said cutting edge comprises a circular arc.

3. Insert of claim 2 wherein the radius of said arc is substantially equal to the thickness of said insert between said faces.

4. Insert of claim 2 wherein said arc is substantially tangent to said exposed face.

5. Insert of claim 1 wherein said compound convex curvature corresponds to the generated surface of said arcuate cutting edge rotated about an axis extending normal to the planes of said faces.

6. Insert of claim 5 wherein said axis is spaced substantially outside of the perimeter of said insert.

7. Insert of claim 6 wherein said axis is in a plane substantially bisecting said insert.

8. Insect of claim 7 wherein said arcuate cutting edge comprises a circular arc.

9. On-edge indexable insert for cutting arcuate corners comprising parallel seating and exposed faces, four sides extending between said faces, an arcuate cutting edge oriented at the intersection of at least one of said four sides, and a convex toric segment surface extending backwardly from said arcuate cutting edge, said surface intersecting a planar side surface having minimum extension from said seating face at said cutting edge increasing to a maximum intermediate dimension, and diminishing toward the trailing edge, to provide a planar locating surface for abutment in an insert pocket of a tool when said cutting edge is indexed to an inactive position.

10. Insert of claim 9 wherein said arcuate cutting edge is a circular arc extending for substantially 90°.

11. Insert of claim 10 wherein said arcuate cutting edge is a circular arc extending substantially tangent to said exposed face.

12. Insert of claim 11 wherein said arcuate cutting edge has a radius substantially equal to the thickness of said insert.

13. On edge indexable insert for cutting arcuate corners comprising parallel seating and exposed faces, four sides extending between said faces, an arcuate cutting edge at each intersection of said sides and exposed faces, and a convex toric segment surface extending backwardly from said arcuate cutting edge, said surface intersecting a planar side surface having minimum extension from said seating face at said cutting edge increasing to a maximum intermediate dimension, and diminishing toward the trailing edge, to provide a planar locating surface for abutment in an insert pocket of a tool when cutting edge is indexed to an inactive position.

14. Insert of claim 13 wherein said arcuate cutting edge is a circular arc extending substantially tangent to said exposed face.

15. Insert of claim 14 wherein said arcuate cutting edge has a radius that is equal to one-half the thickness of said insert and radius is utilized on both sides of said insert.

* * * * *

UNITED STATES PATENT AND TRADEMARK OFFICE
CERTIFICATE OF CORRECTION

PATENT NO. : 5,035,546
DATED : 7/30/91
INVENTOR(S) : James A. Pawlik

It is certified that error appears in the above—identified patent and that said Letters Patent is hereby corrected as shown below:

Column 4  Line 1

"Insect" should be replaced with "Insert"

Signed and Sealed this

Fifteenth Day of December, 1992

*Attest:*

DOUGLAS B. COMER

*Attesting Officer*  *Acting Commissioner of Patents and Trademarks*